United States Patent [19]

Bearden

[11] Patent Number: 5,189,263
[45] Date of Patent: Feb. 23, 1993

[54] HUMAN-PORTABLE GEOPHYSICAL ENERGY SOURCE

[75] Inventor: Joe M. Bearden, Shaw Centre, Singapore

[73] Assignee: Chevron Research and Technology Company, San Francisco, Calif.

[21] Appl. No.: 833,231

[22] Filed: Feb. 10, 1992

Related U.S. Application Data

[63] Continuation-in-part of Ser. No. 725,236, Jun. 26, 1991, abandoned, which is a continuation of Ser. No. 551,968, Jul. 12, 1990, abandoned.

[30] Foreign Application Priority Data

Mar. 6, 1992 [DK] Denmark ............................ 309/92
Mar. 11, 1992 [BR] Brazil ............................... 9105810

[51] Int. Cl.⁵ .............................................. G01V 1/04
[52] U.S. Cl. .................................... 181/113; 181/119; 367/189
[58] Field of Search .............. 367/143, 189, 190, 14; 181/101, 108, 111, 113, 114, 115, 116, 117, 118, 119, 120, 121, 401, 402

[56] References Cited

U.S. PATENT DOCUMENTS

| | | | |
|---|---|---|---|
| 2,275,098 | 9/1966 | Filler | 181/0.5 |
| 3,268,028 | 8/1966 | Miller | 181/0.5 |
| 3,310,128 | 3/1967 | Chelminski | 181/114 |
| 3,718,206 | 2/1973 | Bubb et al. | 181/114 |
| 4,008,784 | 2/1977 | Bays | 181/114 |
| 4,020,919 | 5/1977 | Broding | 181/401 X |
| 4,078,632 | 3/1978 | Horsman | 181/117 |
| 4,108,271 | 8/1978 | Chelminski | 181/119 |
| 4,597,464 | 7/1986 | Chelminski | 181/114 |
| 4,712,641 | 12/1987 | Chelminski | 181/113 |
| 4,739,857 | 7/1988 | Airhart | 181/113 |
| 4,739,859 | 7/1988 | Delan | 181/119 |

FOREIGN PATENT DOCUMENTS

890305 12/1981 U.S.S.R. .

*Primary Examiner*—Brian S. Steinberger
*Attorney, Agent, or Firm*—W. K. Turner; E. A. Schaal

[57] ABSTRACT

A human-portable geophysical energy source is disclosed having an earth-coupling element, a means for providing seismic energy operably connected to that earth-coupling element, a lower container and an upper container connected to the means for providing seismic energy, a framework that minimizes vibrations of the liquid by keeping the upper and lower containers inflexible when they are completely filled with liquid, and a hydraulic pump for filling and removing liquid from the containers. The lower container is located spatially between the earth-coupling element and the means for providing seismic energy. The upper container is located spatially above the means for providing seismic energy. The liquid provides mass to impart energy through the earth-coupling element and to maintain coupling with the earth.

2 Claims, 4 Drawing Sheets

HUMAN-PORTABLE GEOPHYSICAL ENERGY SOURCE

CROSS-REFERENCE TO RELATED APPLICATIONS

This is a continuation-in-part of application Ser. No. 725,236, filed Jun. 26, 1991, entitled "Human-Portable Geophysical Energy Source," now abandoned which was a file wrapper continuing application of Ser. No. 551,968, filed Jul. 12, 1990, entitled "Human-Portable Geophysical Energy Source", now abandoned.

The present invention relates to a geophysical energy source that can be carried by people, without the need of vehicles to provide propulsion and mass.

BACKGROUND OF THE INVENTION

For the past sixty years the petroleum and mining industries have used energy sources to generate surface and sub-surface vibrations within the earth. The reflected energy returning from sub-surface geologic strata is recorded, processed, and analyzed to estimate the most favorable locations to find petroleum or mineral deposits. These efforts are referred to as geophysical or seismic surveys.

Historically, explosives have been the main energy source used for geophysical surveys. These explosives are detonated under accurately timed conditions so that one can measure the elapsed time required for the energy to propagate through the earth and be reflected back to sensitive detectors deployed on or near the earth's surface. These detectors respond to the reflected energy and the vibrations from the reflected energy cause small alternating current voltages that are amplified and then recorded. Accurate estimates can be made about the shape and depth of subterraneum strata and the probability of locating petroleum or mineral deposits from the analysis of this recorded data.

Because the explosive energy is impulsive and non-directional, the signal-to-noise ratios of the recorded data are often too poor to estimate accurately the depth and shape of the desired strata. Thus, other types of energy sources are often used to improve the signal-to-noise ratios in those areas where explosive energy is not effective.

One such energy source is produced by the combination of servo controlled, hydraulically or pneumatically driven vibrator units. It has become the preferred geophysical energy source in many areas of the world. It uses large, self-propelled vehicles that provide a large mass to insure that the vibrator units remain coupled to the earth and produce downward energy.

These vibrator units are driven by electronically produced, oscillatory signals that are amplified by the hydraulic or pneumatic pressure of the unit and cause a baseplate to shake in unison with the applied signals. Normally, these signals are mathematically coded so that the coded information can be removed from the reflected or refracted energy either before, during, or after the data is recorded.

Examples of these vibrator units are disclosed in U.S. Pat. Nos. 3,310,128; 3,718,206; 4,008,784; 4,078,632; and 4,712,641.

U.S. Pat. No. 3,310,128, entitled "Seismic Exploration Methods and Systems," teaches a vehicle that has a tank for holding liquid, a means for supplying and removing liquid to the tank, a repeater gas releasing device, and a means for mounting the device in the tank below the level of liquid.

U.S. Pat. No. 3,718,206, entitled "Amphibious Seismic Exploration Vehicle and Method," teaches a vehicle that provides a seismic signal. That vehicle has a hollow metal casing and pneumatic tires. When the casing and tires are filled with liquid, an acoustic signal transducer transmits a pressure pulse to the surface of the tires. This vehicle can be towed.

U.S. Pat. No. 4,008,784, entitled "Seismic Signal Source," teaches tracked vehicle that provides a seismic signal. That vehicle has a signal means and a conduit means for transferring the seismic signal to a non-compressible fluid within a fluid-filled tire.

U.S. Pat. No. 4,078,632, entitled "Land Seismic Gas Detector," teaches seismic gas detonator. The bottom plate of the detonator has an inwardly-directed slope for increasing the coupling efficiency between the bottom plate and the earth. The detonator is attached to a seismic truck. Part of the detonator is a container which can be made from a car tire, which is maintained upright by lateral support that is pivotally supported by a rod that is hydraulically operated by an inclined cylinder pivotally secured to the truck.

U.S. Pat. No. 4,712,641, entitled "Method and System for Generating Shear Waves and Compression Waves in the Earth for Seismic Surveying," teaches a vehicle that has a liquid-filled cylinder means, an earth-contacting plate mounted in the cylinder, a piston-like reaction mass, and an air gun.

U.S. Pat. Nos. 3,310,128; 3,718,206; 4,008,784; 4,078,632; and 4,712,641 are hereby incorporated by reference for all purposes.

Since these energy sources must be held to the earth, and since the amount of force imparted into the earth is a direct relation to the weight of the mass used, these types of sources cannot be used efficiently in rugged, hostile or impassable terrain, such as a jungle. Thus, large areas of land cannot use these techniques.

SUMMARY OF THE INVENTION

The present invention is a geophysical energy source that is capable of being carried by human beings, without the need of vehicles to provide propulsion and mass. Unlike the patents cited above, the present invention does not use a vehicle to move the source or to provide mass to impart energy through the earth-coupling element. Instead, each element can be carried by porters through a jungle and the complete unit can be assembled on-site in the jungle, using local water to provide mass to impart energy through the earth-coupling element.

This geophysical energy source has an earth-coupling element, a means for providing seismic energy operably connected to the earth-coupling element, a containing means connected to the means for providing seismic energy, and a means for filling and removing liquid from the containing means. The containing means has at least one flexible container. The liquid within that container provides mass to impart energy through the earth-coupling element.

This unique design uses the weight of water contained in flexible bags to provide the mass and "hold-down" weight instead of using the weight of the vehicular units. "Hold-down" weights of over five thousand pounds can be used by this method, which should be adequate in many areas.

Preferably, the containing means has an upper container and a flexible lower container. The means for providing seimic energy is located between the two containers, and the earth-coupling element is located below both containers. Both containers may be covered with a puncture-resistant material.

This invention uses the mass and weight provided by an accumulation of liquid. This accumulation of liquid can be moved by any of the various forms of pumps, centrifuges, flowlines, gravity feed, suction or any other manner that can cause a liquid to move from one location to another. The resulting mass can provide coupling, reaction, or force in any relation to the center of gravity of the mass. Therefore, that mass can be moved by conduits, pipes, canals, hoses, tubes or any other device conducive to the movement of liquid, through most areas that do not support vehicular movement.

Advantages of using liquid as an easily moved mass include:

(1) the liquid can be used repeatedly by using multiple units,
(2) flexible containers can be used to hold the liquid,
(3) containers can be stacked to increase the mass,
(4) human-portable pumps are easily carried to move the liquid,
(5) all components of the source units can be designed to allow the units to be carried by manpower,
(6) operations cost is low because minimal expendable supplies are needed, and
(7) multiple units can be supported by a single set of electronics.

BRIEF DESCRIPTION OF THE DRAWINGS

In order to facilitate the understanding of this invention, reference will now be made to the appended drawings of the preferred embodiments of the present invention. The drawings are exemplary only, and should not be construed as limiting the invention.

DETAILED DESCRIPTION OF THE PREFERRED EMBODIMENTS

Figure 1:
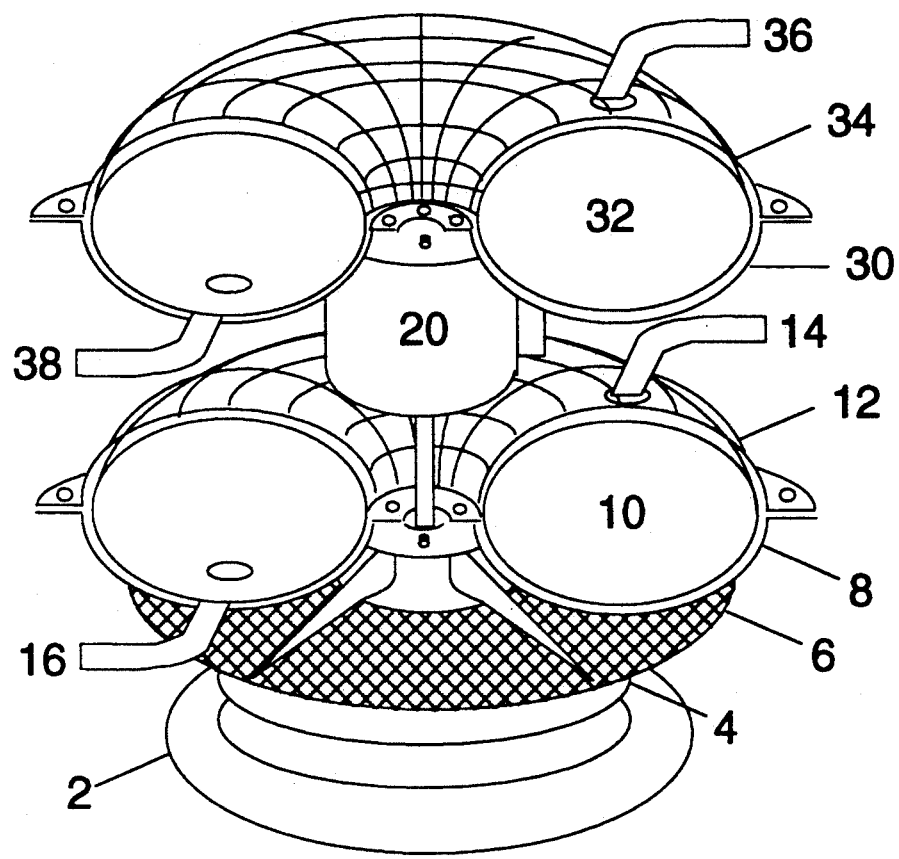
FIG. 1 is a schematic drawing of one embodiment of the present invention, using both an upper containing means and a lower containing means.

In its broadest aspect, the present invention is a human-portable geophysical energy source having an earth-coupling element, a means for providing seismic energy operably connected to the earth-coupling element, a containing means having at least one flexible container, and a means for filling and removing liquid from the containing means. The liquid provides mass to impart energy through the earth-coupling element and to maintain coupling with the earth.

By "earth-coupling element," we mean an element that is in direct connection with the earth and couples imparted energy to the earth. A typical earth-coupling element is a baseplate.

By "means for providing seismic energy" we mean a device that generates geophysical energy that can be imparted to earth. An example of specifications for such a means for providing seismic energy could be as follows:

1. size/weight:
    No component over 50 kg.
    Nine components: two frames, bladder, actuator, pump, electronics, generator or batteries, hoses/cables, top mass.
2. power requirements
    a. electrical power: 12 v.d.c. generator or battery
    b. hydraulic power: gasoline or diesel powered engine driving a high pressure hydraulic pump.
3. ground force: at least 600 reaction mass, 3000 p.s.i.
4. sweep capabilities.
    a. 5–250+ hz.
    b. programmable, custom sweep. no EPROMS
5. reaction mass. 600 lb.
6. hold-down weight. greater than ground force
7. move up time/assembly-disassembly—approximately five minutes
8. operating considerations:
    a. no component over 50 kg.
    b. all electrical power at 12 v.d.c.
    c. minimize components attached to vibrator frame
    d. centralize electronics/wired to vibrator units
    e. usually one vibrator vibrating at a time
    f. minimize special engineering
    g. retrofit baseplate for different environments.

Preferably, the containing means has an upper container and a lower container. The lower container is spatially above the earth-coupling element. The upper container is spatially above both the lower container and the means for providing seismic energy. Both of the containers may be covered with a puncture-resistant protective material. In this embodiment, the bottom container acts as the hold-down mass and the top container acts as a reactance mass. In another embodiment, only the lower container is used, and lead weights are used for reactance mass.

Preferably, vibrations of the liquid within the containing means should be minimized as much as possible. One means of doing this is by using a framework that restrains movement of the containing means when that containing means is completely filled with liquid. Isolator rings could be used between the containing means and the base plate to help reduce vibration of the containing means.

Preferably, the means for filling and removing liquid from the containing means is a hydraulic pump.

These geophysical energy sources can be used within a system multiple energy sources. The multiple sources can be used simultaneously to increase the effective amount of energy at a given location to cancel undesired signal characteristics associated with the use of a single source. Alternatively, the multiple sources can be used sequentially to improve work efficiency and to provide storage reservoirs of the liquid for anticipated work. When used sequentially, the liquid can be moved from one source to the other. The water will simply be pumped from multiple units, as work progresses, by the use of man-portable water pump units which can easily pump more than 150 gallons of water a minute. This type of pump is used daily within our geophysical operations to supply the dynamite shot-hole drilling units with water.

Referring to FIG. 1, which is one embodiment of the present invention, base plate 2 rests on the surface of the earth and couples the apparatus to the earth. The design of the base plate will vary with the earth surface. Double action hydraulic actuator unit 20 is connected to base plate 2 and provides seismic energy to the base plate.

The hold-down mass for this invention is provided by a fluid-filled flexible bladder 10 that is contained in rigid frameworks 6, 8, and 12. Upper rigid framework 8 and lower rigid framework 8, when attached to each other, compress bladder 10 to increase pressure and reduce movement of fluid. These elements can be carried individually to a site of seismic testing and can be assembled at the site. When assembled, and when the bladder is overpressured with fluid, the bladder 10 and rigid frameworks 8 and 12 rest on, and are connected to, rigid framework 6. The flexible bladder 10 and rigid frameworks 6, 8, and 12 form a containing means that provides hold-down mass to the base plate. Pneumatic rings 4 isolate the hold-down mass from the base plate and reduce vibration of the fluid.

Flexible bladder 10 is filled with fluid through hose 14. When done, fluid is drained from bladder 10 through hose 16. Preferably, both hoses have fast host disconnect couplings. The fluid used in the bladder often can be obtained on-site. For instance, water from a nearby stream can be used.

Reactance mass is provided by a second containing means similar to the first. That second containing means has flexible bladder 32 that is contained in rigid frameworks 30 and 34. Upper rigid framework 34 and lower rigid framework 30, when attached to each other, compress bladder 32 to increase pressure and reduce movement of fluid. The bladder is filled with fluid through hose 36. When done, fluid is drained from the bladder through hose 38. These elements can be carried individually to a site of seismic testing and can be assembled at the site. The fluid provides mass to impart energy through the earth-coupling element and to maintain coupling with the earth. Note that, in the figures, the two containing means are shown in cut-away view to reveal other parts of the apparatus.

Figure 2:
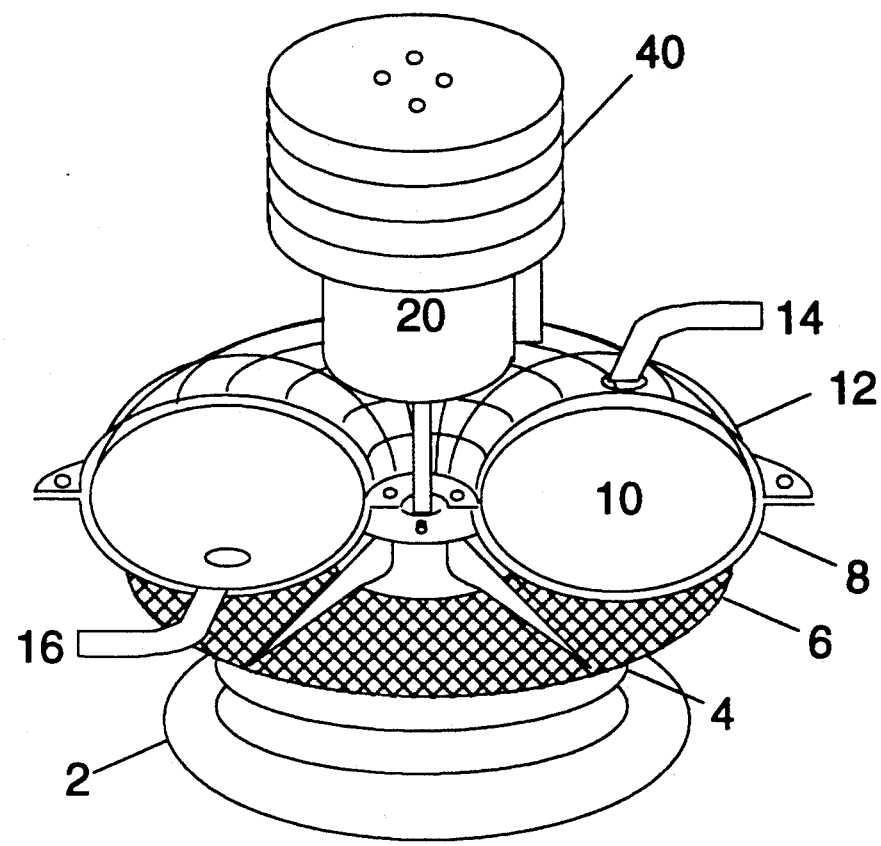
FIG. 2 is a schematic drawing of one embodiment of the present invention, using a lower containing means and lead weights.

FIG. 2 shows an alternative embodiment wherein the second containing means is replaced with multiple lead weights 40, each of only 40 kgs so that they could be carried to the site. This embodiment could be used when there is no on-site fluid, and fluid has to carried to the site. Clearly, the first embodiment (shown in FIG. 1) would be preferable if there is on-site fluid.

Figure 3:
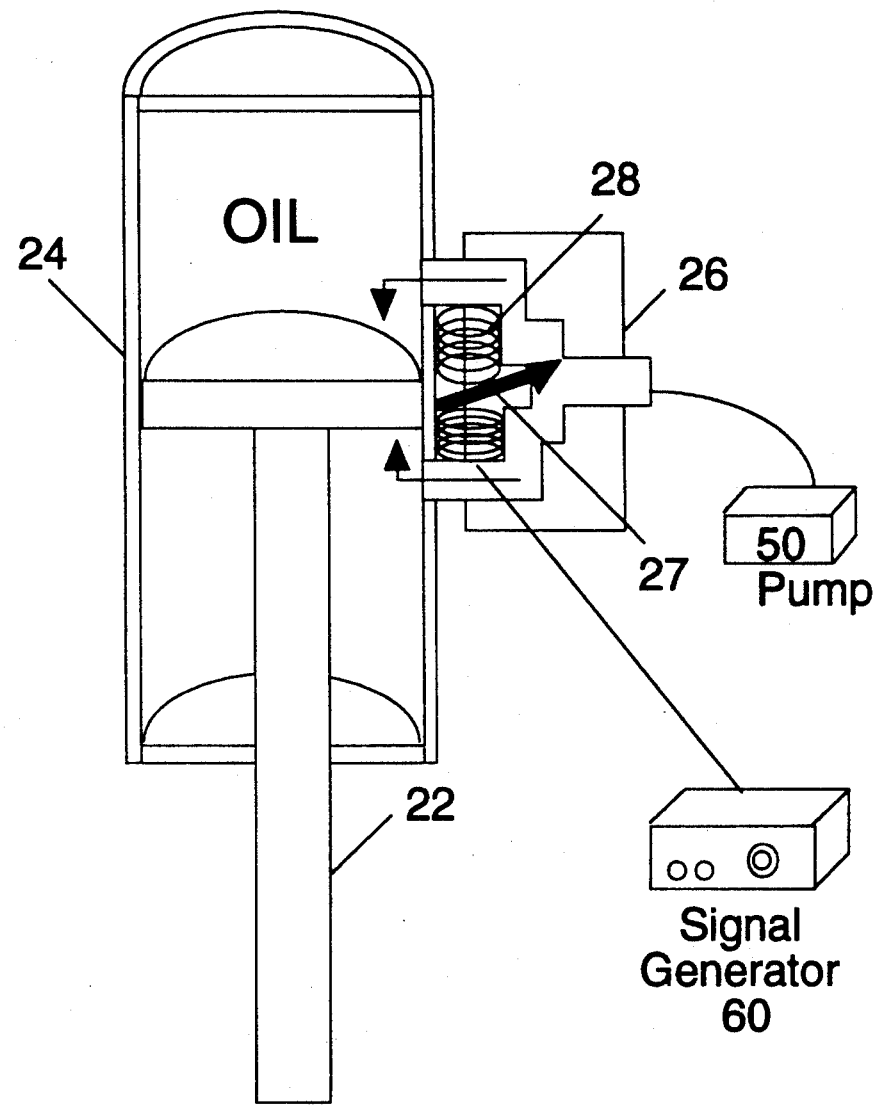
FIG. 3 is a schematic drawing of one actuator actuator assembly useful in the present invention.

FIG. 3 shows a cut-away schematic drawing of a double action hydraulic actuator unit 20 useful in the present invention. Piston 22 is connected to the base plate (not shown in this figure). Piston 22 slides up and down hydraulic cylinder 24. Oil is in the space inclosed by the piston and the hydraulic cylinder.

Servo valve 26 directs the pressure provided by hydraulic fluid carried from the hydraulic pump 50. Servo valve 26 is modulated by a sinusoidal signal from signal generator 60 which causes the piston assembly to move in unison with the signal from the signal generator 60 to servo valve 26. The position of pilot spool control valve 27 is controlled by coils 28, which are driven by the signal from signal generator 60. This modulated pressure forces the earth to move in proportion to the total force generated by the movement of the reactance mass and the hydraulic actuator unit. Of course, the force is limited by the amount of pressure used.

The above descriptions apply to a typical use of the concept but is not limited to vibrator energy sources alone. Many other energy sources are used by the geophysical industry which require a vehicle to provide propulsion and hold-down mass. This concept will equally apply to these methods. Some of these methods use hydraulic rams, air guns which expel a volume of high pressure gas into a medium, vacuum activated rams are sometimes used and many other types of techniques to impart energy into the earth.

Figure 4:
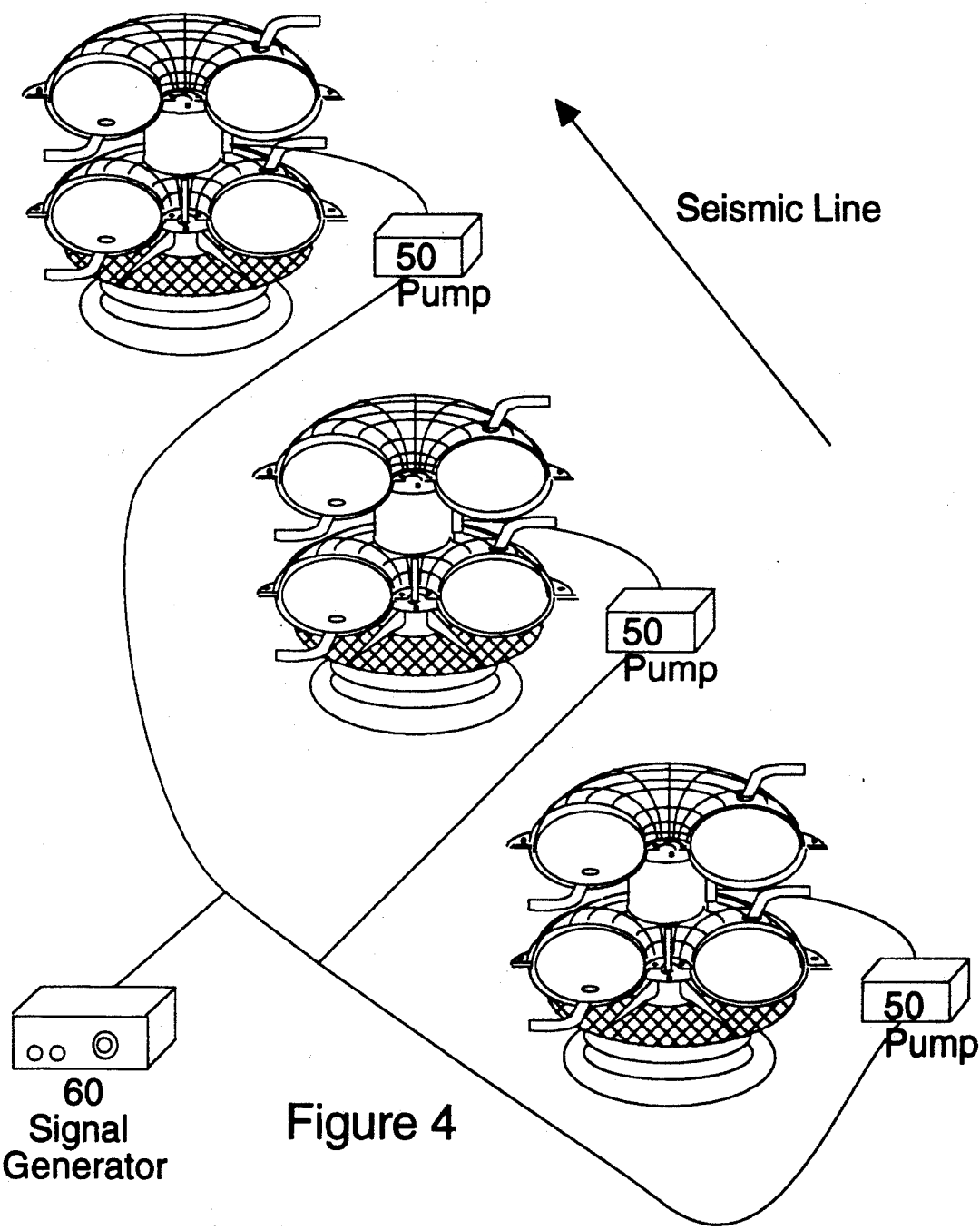
FIG. 4 is a schematic drawing of the use of more than one human-portable unit.

In one embodiment, a multitude of seismic sources can be tied to one sweep generator. FIG. 4 shows one such embodiment, wherein three sources are used, each with their own hydraulic pump 50 to provide hydraulic fluid to the servo valve of each source. The servo valve of each unit is modulated by a sinusoidal signal from signal generator 60 which causes the piston assembly to move in unison with the signal from the signal generator 60 to the servo valve. This modulated pressure forces the earth to move in proportion to the total force generated by the movement of the reactance mass and the hydraulic actuator element. Of course, the force is limited by the amount of pressure used. The fluid in the upper and lower containing means can be transferred from unit to unit as needed.

While the present invention has been described with reference to specific embodiments, this application is intended to cover those various changes and substitutions which may be made by those skilled in the art without departing from the spirit and scope of the appended claims.

What is claimed is:

1. A geophysical energy source comprising:
   (a) an earth-coupling means, wherein the earth-coupling means does not weigh substantially more than 50 kg, enabling the earth-coupling means to be capable of being carried by a human on foot;
   (b) a hydraulic means for providing seismic energy operably connected to the earth-coupling means, wherein the hydraulic means does not weigh substantially more than 50 kg, enabling the hydraulic means to be capable of being carried by a human on foot;
   (c) a containing means comprising at least one flexible container that provides hold-down mass to the earth-coupling means to maintain coupling with the earth, wherein the containing means comprises an upper container and a lower container, wherein the lower container is spatially above the earth-coupling means, and the upper container is spatially above both the lower container and the means for providing seismic energy, wherein neither the upper container nor the lower container weights substantially more than 50 kg, enabling the containing means to be capable of being carried by a human on foot; and
   (d) a means for filling and removing liquid from the containing means, wherein the means for filling and removing liquid comprises;
      (1) a pump component:
      (2) at least one hose component; and
      (3) an electrical power source;
      wherein each component does not weigh substantially more than 50 kg, enabling each component of the means for filling and removing liquid to be capable of being carried by a human on foot.

2. A seismic energy system comprising at least two geophysical energy sources according to claim 1.

* * * * *